Feb. 5, 1952  A. C. HOFFMAN ET AL  2,584,877
OIL TANK AND SYSTEM
Filed April 30, 1945  5 Sheets-Sheet 1

Inventors
Allan C. Hoffman
Walter H. Geddes
James D. Olcott
by J. E. Beringer
Attorney Feb. 5, 1952     A. C. HOFFMAN ET AL     2,584,877
OIL TANK AND SYSTEM
Filed April 30, 1945     5 Sheets-Sheet 2
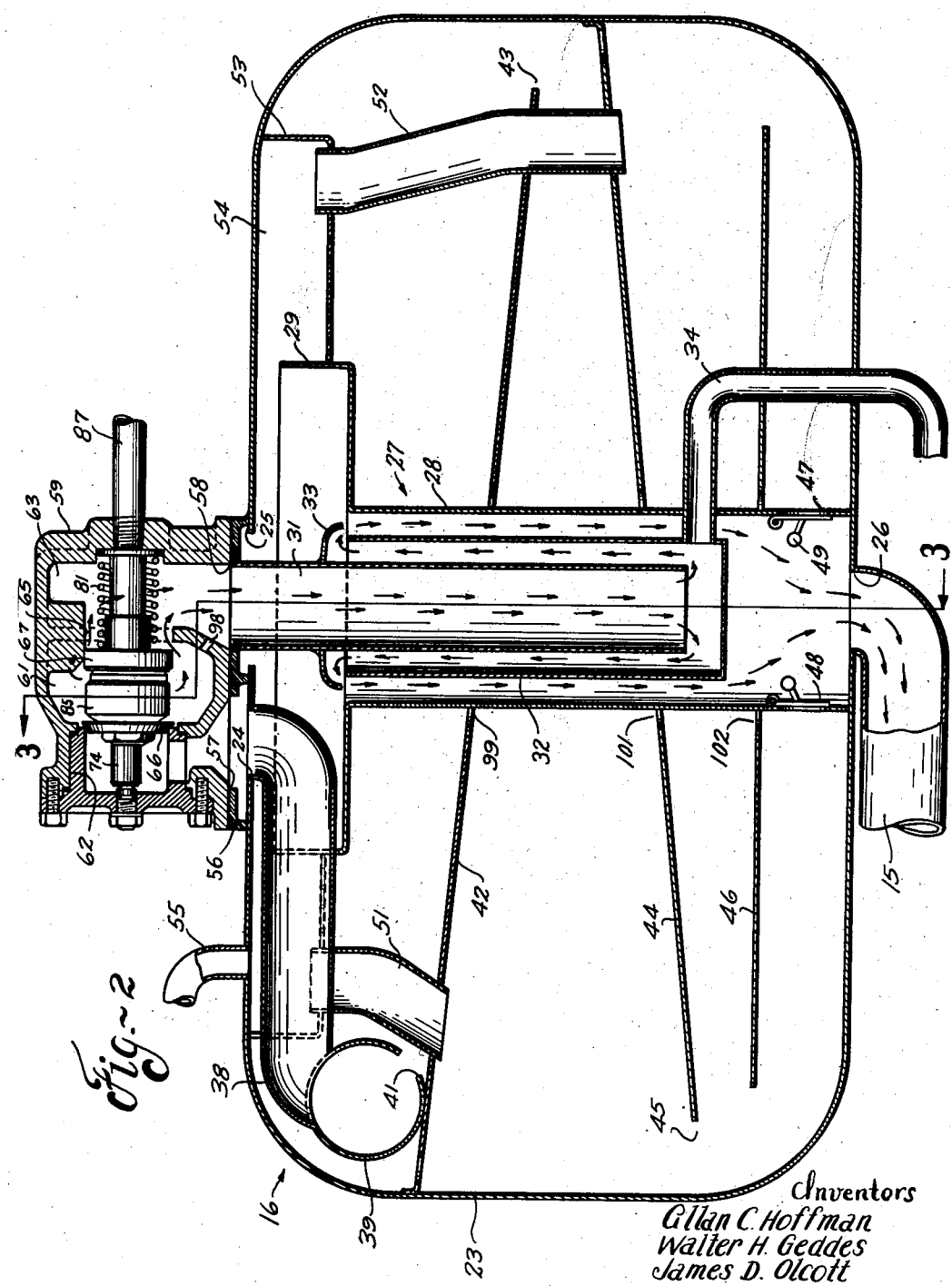

Feb. 5, 1952  A. C. HOFFMAN ET AL  2,584,877
OIL TANK AND SYSTEM

Filed April 30, 1945  5 Sheets-Sheet 3

Inventors
Allan C. Hoffman
Walter H. Geddes
James D. Olcott
by- JEBeringer
Attorney

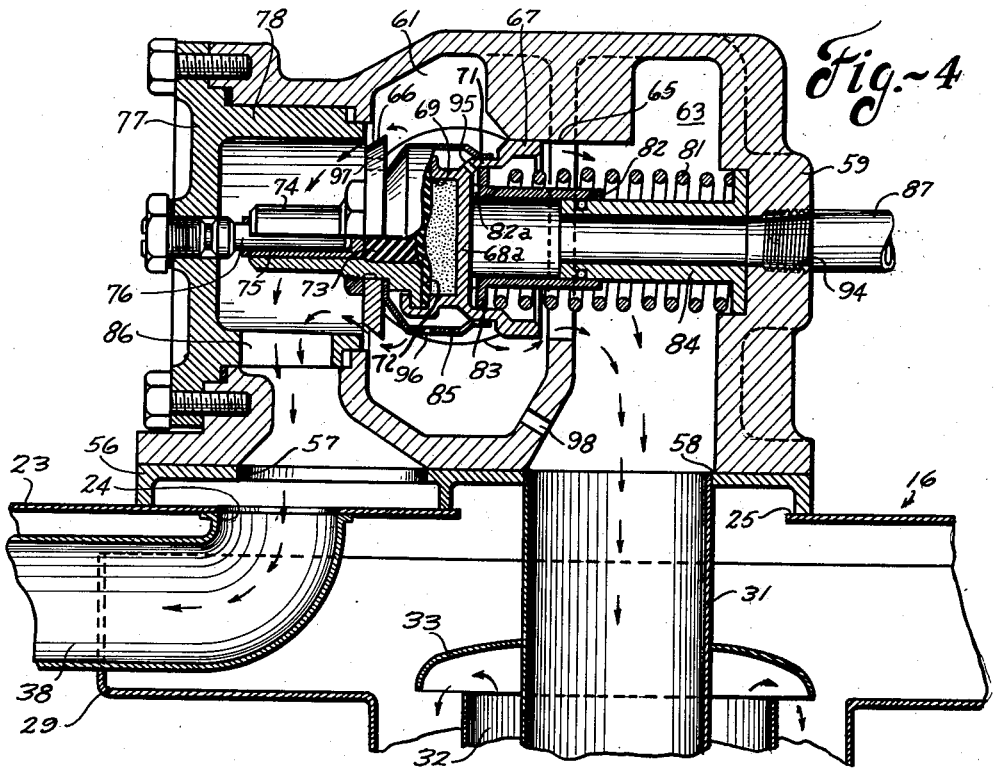
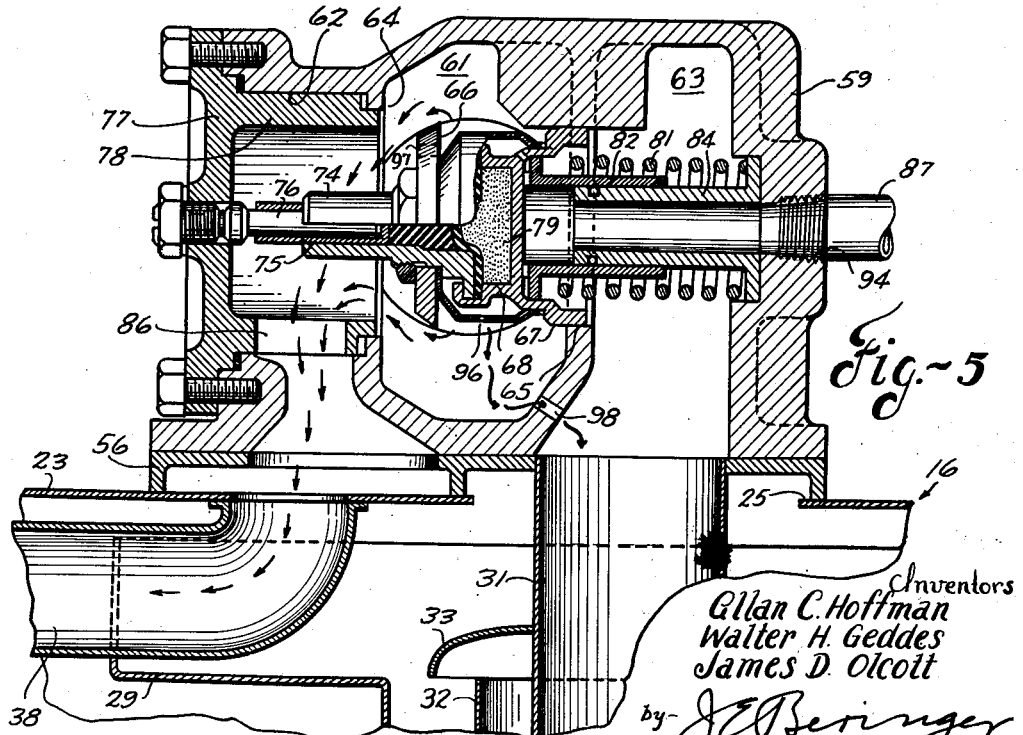

Feb. 5, 1952     A. C. HOFFMAN ET AL     2,584,877
OIL TANK AND SYSTEM

Filed April 30, 1945

Inventors
Allan C. Hoffman
Walter H. Geddes
James D. Olcott
by J.C. Beringer
Attorney Patented Feb. 5, 1952

2,584,877

UNITED STATES PATENT OFFICE 2,584,877

OIL TANK AND SYSTEM

Allan C. Hoffman, Yellow Springs, and Walter H. Geddes and James D. Olcott, Dayton, Ohio, assignors to United Aircraft Products, Inc., Dayton, Ohio, a corporation of Ohio Application April 30, 1945, Serial No. 591,182

22 Claims. (Cl. 123—196)

This invention relates to apparatus for regulating the condition of oil supplied to an aircraft engine or the like for lubricating purposes.

In general, the object of the invention is to supply to the engine, oil which is conditioned for effective lubrication at all temperatures and at all altitudes of flight, and to remove from the oil discharged by the engine functional characteristics of an objectionable kind.

Aircraft design of recent effort has been directed to improvement of operation at high altitude and under conditions of low temperature. The need for major modification of the engine lubrication system has been particularly felt, and corrective measures have been applied in the form of oil temperature regulators, deaerators and diluting means. Oil temperature regulators having quick warm-up and anti-congealing characteristics are successfully employed but the problem of complete oil conditioning is not fully answered by limiting the maximum oil temperature to a predetermined value. Deaerators of the kind heretofore known add a new unit to the lubrication system and often are objectionable as causing an undesirably high pressure drop. The addition of a diluent to the oil, to lower its viscosity and thereby insure quick engine start under cold climatic conditions, has proved a process of merit but has in the past brought on certain deleterious effects such as violent boiling in the oil tank (resulting in spewing and loss of oil) and the supplying of a lubricant to the engine too low in viscosity for proper lubrication.

The present invention encompasses all known lubrication problems, and its approach toward modification of the lubrication system has begun at the source of oil supply, namely the oil tank. It is contemplated that the tank and associated parts shall function:

(a) To supply an adequate volume of oil to the engine, with substantially all the oil in the tank being effectively and quickly conditioned for flow.

(b) To deaerate the oil.

(c) To effect dilution of a portion of the oil in the system and to segregate the diluted oil from the non-diluted oil.

(d) To regulate the temperature of the oil at temperature values lower than the maximum set by the oil temperature regulator.

(e) To prevent the combined effects of dilution and rapid warm-up from decreasing the lubricant viscosity to an objectionably low level.

A further object of the invention is to incorporate in the engine lubrication system a reservoir from which fluid subsequently placed under pressure may be supplied to the propeller feathering mechanism of the aircraft, such reservoir to be normally supplied with diluted oil but arranged to receive diluent alone should the oil supply be exhausted or inadequate.

A still further object of the invention is to enable the process of dilution of the lubricating oil to be accompanied by a forced flow of the circulating oil through the oil temperature regulator, whereby to cool the oil and inhibit a rapid decline of viscosity and boil off of the diluent.

Other objects and structural details of the invention will appear from the following description, when read in connection with the accompanying drawings, wherein:

Fig. 2 is a view in longitudinal section, partly diagrammatic of the oil tank, including a thermostatically controlled flow sequence valve shown as it is positioned during warm-up of the engine or when the oil is cold;

Fig. 4 is a fragmentary view of the oil tank, showing the sequence valve as it appears during a late stage of the warm-up period;

Fig. 5 is a view similar to Fig. 4, showing the sequence valve as it appears when the oil is hot;

Figure 1:
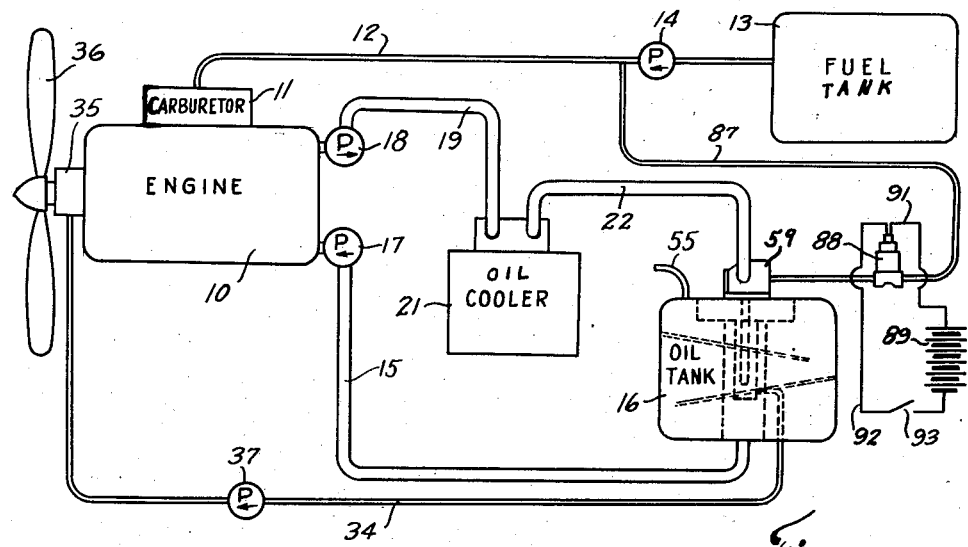
Fig. 1 is a diagram of an aircraft engine lubrication system and engine fuel system, in accordance with the present invention.

In the diagram comprising Fig. 1 an aircraft engine is indicated at 10 and its carburetor at 11, the carburetor being supplied with liquid fuel such as gasoline by a conduit 12 leading from a fuel tank 13. A pump 14 is disposed in the line 12 and causes the fuel to flow to the engine under pressure. Lubricating oil is directed to the engine by way of a conduit 15 connected at its opposite ends to the engine and to an oil tank 16. An engine driven pump 17 is arranged in the line 15 adjacent the engine 10 whereby oil may be drawn from the tank 16 and forced under pressure to the engine bearings and centers of lubrication. After passing through the engine the oil may collect in a sump or the like from which it is drained by another engine driven pump 18 and returned thereby to tank 16. The return oil conduit consists of a line 19 connecting the pump 18 to the inlet of an oil cooler 21, and a line 22 connecting the outlet of the oil cooler to the oil tank 16. During operation of the engine 10 the pumps 17 and 18 function continuously, the former to draw oil from the tank 16 and deliver it to the engine and the latter to take the oil from the engine and return it by way of the oil cooler 21 to the tank for re-use.

Figure 3:
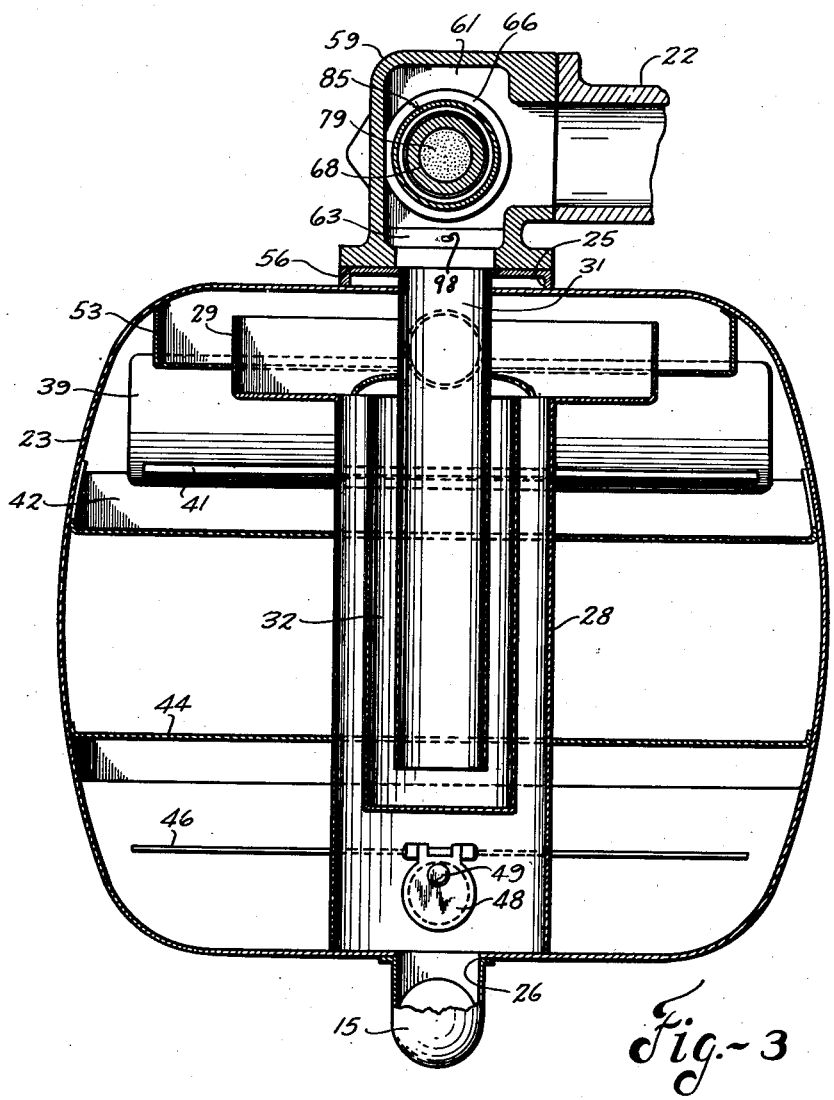
Fig. 3 is a view of the oil tank in cross section, taken substantially along the line 3—3 of Fig. 2.

Referring to Figs. 2 and 3, the oil tank 16 comprises an outer shell 23 which may assume different shapes and sizes in accordance with the capacity of the system and with the location in the aircraft in which the tank is to be installed. The present illustration is in part diagrammatic, and shows the tank as a one-piece sheet metal container generally rectangular in form. The tank has alternative inlets 24 and 25 positioned adjacent one another on the upper side of the tank, and a single outlet 26 on the lower side of the tank. The engine supply conduit 15 is connected to the tank at the outlet 26. Vertically disposed within the tank shell 23 and extending between the inlet 25 and outlet 26 is an inner tank compartment or hopper 27. The hopper 27 comprises a generally cylindrical body portion 28 having one end resting on the lower side of the tank in a position surrounding outlet 26, and further comprises a flared upper end 29 constituting an overflow protection. Extending through the inlet 25 downward into the tubular portion 28 of hopper 27 is an inlet conduit 31. There further may be arranged within the tubular portion 28 of hopper 27, in a position surrounding conduit 31, a cylinder 32. The cylinder 32 is closed at its lower end and open at its upper end, whereby the oil from conduit 31 is directed first to the lower end of the cylinder and then compelled to flow upward along the outside of the conduit to the open end of the cylinder where it overflows into the hopper 27 and passes to the outlet 26. A curved baffle 33 is fastened to the conduit 31 immediately above the open end of cylinder 32 in order that displaced oil may be deflected downward in the hopper 27. The function of cylinder 32 is as a reservoir for supplying liquid to the propeller feathering mechanism. It will be observed that the lower end of the reservoir 32 opens into a conduit 34 which is passed through the hopper 27 and out of the tank shell 23. Referring again to the diagram of Fig. 1, it will seen that conduit 34 leads to a hydraulic cylinder 35 constituting the means for feathering the propeller 36. The actual means for turning the propeller to a feathered position forms no part of this invention, and it will be sufficient to say that a selectively operable pump 37 is disposed in line 34, which pump when operated draws oil from reservoir 32 by way of conduit 34 and directs it under pressure to the cylinder 35 where feathering is accomplished in a known manner. It is, however, important and desirable that the oil in line 34 be maintained in a free-flowing condition. To this end, as will hereinafter appear, the feathering line is diluted as a part of the general dilution process.

Within the shell 23 of the oil tank 16 is a conduit 38 having one end registering with the tank inlet 24 and discharging at its other end into a manifold 39. As may be seen in Fig. 3, the manifold 39 is located near one end of the tank and adjacent the upper side thereof, and extends as a closed cylinder for approximately the full width of the tank. A longitudinally elongated slot or opening 41 is formed in the manifold 39 from which the oil flows in a wide shallow stream. Beneath the manifold 39 is a baffle 42 which touches and is secured to three sides of the shell 23 and has one end terminating a short distance from that end of the tank opposite the manifold 39. A passage 43 is defined between the free end of baffle 42 and the adjacent end of the tank. Beneath the baffle 42 is another baffle 44, similarly constructed but oppositely arranged to define a passage 45 around its end at that end of the tank opposite passage 43. While the baffles 42 and 44 are secured to the shell 23, they preferably are fastened by means not constituting a continuous seal, in order that air may not be trapped beneath the baffles. Beneath the baffle 44 is another baffle 46 which is secured to the hopper 27, with its ends terminating short of the walls of the shell. The several baffles 42, 44 and 46 have aligned openings therein to accommodate the tubular hopper 27. The baffles 42 and 43 incline downwardly within the tank, the angle of inclination being gradual so as to produce a relatively slow flow of the oil from the manifold 39 to the bottom of the tank. Thus the oil entering the tank by way of inlet 24 passes through conduit 38 to the manifold 39 from which it emerges as a wide flat stream onto the baffle 42 along which it flows toward the opposite end of the tank and through passage 43 onto the lower baffle 44. The oil stream continues along baffle 44 to the other end of the tank and through passage 45 to the bottom of the tank where it is compelled by baffle 46 to pass toward the outlet 26. The oil so flowing reaches outlet 26 through a series of radial ports 47 in the lower end of the tubular portion 28 of hopper 27. The ports 47 are controlled by flap valves 48 hinged to the interior of the hopper and carrying weights 49 which tend to hold the valves closed until a definite opposing pressure is applied.

The combination of the manifold 39 and inclined baffles 42 and 44 is designed to prevent uneven turbulent flow within the tank, and in so acting to produce an added feature of advantage, namely the release of entrained air from the oil. A well-known disability of aircraft engine lubrication systems, which conventionally are of the dry sump type, is that the high capacity scavenger pump, indicated at 18 in Fig. 1, operates at times to pump air into the system. The air mingles intimately with the oil, particularly under conditions of high temperature, and impairs lubrication. As a deaerating provision the tank has, in addition to the baffles 42 and 44, foam vents 51 and 52 extending downward into the tank. The upper end of each of the vents 51 and 52 projects through a perforated tray 53 which defines within the tank beneath the inlets 24 and 25 a space 54 communicated to the exterior of the tank through a conduit 55. The conduit 55, may, as is indicated in Fig. 1, return to the engine sump or it may simply discharge overboard of the aircraft. The lower end of the vent 51 passes through the baffle 42 near the higher end thereof and terminates immediately beneath that baffle. The vent 52, which is located at the opposite end of the tank, extends through baffle 42 and baffle 44, terminating immediately beneath baffle 44 at the higher end thereof. The low velocity flow of the oil along the baffles 42 and 44, and the shallowness of the flowing stream, permits a separation of the air from the oil in the form of air bubbles or as foam. Bubbles and foam released from the oil during its flow along baffle 42 may rise in the tank and pass through the perforations in tray 53 into the vented space 54. As the oil makes an abrupt turn at the end of each baffle, foam tends to collect beneath the raised ends of the baffles and is permitted to escape therefrom by way of the vents 51 and 52. After rising to the top of the vents 51 and 52 the foam lies in a quiescent condition within the space 54 whereupon the bubbles may coalesce and break, the liquid oil dropping down through the perforations in tray 53 to the main body of oil. The air released from the breaking bubbles passes from the tank by way of conduit 55. Effective deaeration of the oil therefore is accomplished by a combination of means producing a circuitous flow path through the tank, an absence of turbulence and shallowness of the flowing oil stream. The size and shape of the oil tank determines the number, position and size of the baffles and foam vents required for best deaeration.

While the baffles 42, 44 and 46 are shown as made of flat sheet metal stock, they may be corrugated to induce a more rapid release of entrained air. Also, some or all of the baffles may be constructed of wire mesh screen and so function as filters to remove foreign particles from the oil. The large combined surface area of the baffles makes possible a highly effective filter and obviates the need for conventional filter accessories which create a high pressure drop and are limited in surface in proportion to their size.

Figure 7:
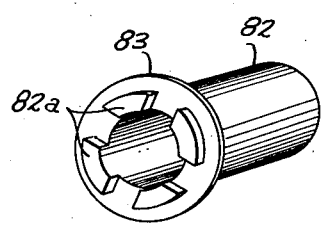
Fig. 7 is a detail view, in perspective, of an element of the sequence valve assembly.

Alternative use is made of the tank inlets 24 and 25 in order that the oil returning from the engine may be directed at one time through the short path represented by the hopper 27, at another time through the long path represented by the baffled passageway in the main tank, and at still another time through both paths. There is mounted on the tank 16 a flange or fitting 56 having openings 57 and 58 therein respectively overlying the tank inlets 24 and 25. Opening 58 may receive with a press fit the upper end of conduit 31. Mounted on the fitting 56 is a sequence valve assembly, including a housing 59 formed with internal walls defining a central inlet chamber 61 and oppositely disposed outlet chambers 62 and 63. As shown in Fig. 3, the central chamber 61 constitutes the discharge end of conduit 22 by which oil returning from the engine is conveyed to the tank. Chamber 62 overlies opening 57 in fitting 56 and so communicates through inlet 24 with conduit 38 and the long path through the tank. Chamber 63 overlies opening 58 in fitting 56 and so communicates with conduit 31 and the short path through the tank. Chamber 61 is connected to chamber 62 by a port 64 and is connected to chamber 63 by a port 65. Within the housing 59 is a valve assembly comprising opposed valves 66 and 67, respectively controlling ports 64 and 65. As may be best seen in Fig. 4, the valve assembly includes a body 68 having a vertical wall 68a defining a chamber 69, and having a rearwardly extending skirted portion 71 which is enlarged at its end to form the valve 67. The valve 67 controls flow through the port 65 by moving partly or wholly within the port. The left hand or front end of the chamber 69 in body 68 is closed by a diaphragm 72, in front of which is a connector plug 73 of rubber or rubber like material contained in a body extension 74. In advance of the plug 73 is a piston 75 slidable upon a pin 76 secured in a plate 77 which serves to close one end of the housing 59. The piston 75 is slidable within the extension 74 which functions as a guide therefor. The valve 66 is mounted on the body 68 and is engageable with the end of a cylindrical projection 78 of the closure plate 77, the projection 78 extending into the housing 59 within the port 64. The valve assembly is thermally actuated, there being within the chamber 69 of body 68 an amorphous material 79 having the property of expansion under the addition of heat. According to the construction and arrangement of the valve parts, expansion of the material 79 is transmitted through the diaphragm 72 and connector plug 73 to the piston 75, and tends to press the piston against the pin 76. The pin 76 being fixed, a reactive force is applied to the body 68 and associated parts tending to move the valve 66 away from port 64 and to move the valve 67 toward port 65. When the thermal substance 79 cools it is recompressed, and the body 68 returned to its starting position, by a spring 81. The spring 81 surrounds a sleeve 82 having one end within the skirt 71 and formed with circumferentially spaced lugs or projections 82a (see Fig. 7) seated on the wall 68a of body 68. A radial flange 83 is formed on the sleeve 82 at the base of projections 82a, and contacts the inner wall of skirt 71. The sleeve 82 extends through port 65 into chamber 63, and spring 81 is interposed between the flange 83 and the wall of body 59. The free outer end of sleeve 82 receives one end of a bushing 84, the opposite end of which is formed with a flange accommodated in a recess in the wall of body 59 and serving as a base for the spring 81.

The valve body 68 and valves 66 and 67 are arranged within inlet chamber 61, so that oil entering the chamber 61 may flow around the valve assembly and by a processes of heat conduction induce in the thermal substance 79 an action appropriate to the temperature of the oil. In order that the oil may not heat the substance 79 too quickly a hood or shroud 85 is mounted on the body 68 in spaced relation to that part defining chamber 69. In accordance with the varying temperature of the oil, therefore, the valve assembly is caused to move in such manner as to direct the oil entering chamber 61 either to chamber 62 or to chamber 63. Also it will be noted that the valve assembly may assume an intermediate position in which the flow is split, flowing in part to chamber 62 and in part to chamber 63. The oil in chamber 62 is permitted to pass to the tank inlet 24 by way of a series of openings 86 in the projecting portion 78 of closure plate 77. In general, the operation of the valve assembly is such that when the oil returned from the engine is cold, or below a predetermined temperature value, the parts assume under the urging of spring 81 a position like that shown in Fig. 2. Thus valve 66 is held closed within a port 64 and flow is denied to tank inlet 24, while port 65 is open permitting the oil to pass therethrough and by way of conduit 31 to the hopper 27. A quantity of oil less than that available in the system thereby is circulated. As the circulating oil acquires a higher temperature value, such temperature change is reflected in expansion of the thermal substance 79 resulting in motion of the valve assembly to withdraw valve 66 from closed position and to move valve 67 toward port 65. As is indicated in Fig. 4, during an intermediate range of temperature values the oil flow will be divided between the ports 64 and 65, both of which are open. As the oil temperature continues to increase, the motion of the valve 67 toward closed position will continue until port 65 is blocked (Fig. 5), so preventing further flow through the tank by way of hopper 27. Substantially all the oil returned from the engine then must pass by way of port 64 to inlet 24 and the long path through the tank. It will be observed that the manner of closing port 65 by valve 67 is such that in the event of excessive pressure in the system, as may result from a blocking of the flow in the main body of the tank, valve 67 may move under pressure through and beyond port 65 to permit a by-passing flow of the oil to the tank by way of hopper 27.

According to the present invention the introduction of a diluent into the system is accomplished through the valve housing 59, and is accomplished in such manner that irrespective of the oil temperature the flow through the tank during dilution will be by way of the hopper 27. This is desirable in the interests of economy of time and of diluent. The diluent employed may, as is indicated in Fig. 1, be gasoline drawn from the fuel tank 13. A conduit 87 is connected at one end to the fuel line 12 on the pressure side of pump 14 and is connected at its other end to the tank valve housing 59. Interposed in the conduit 87 is an electrically actuated solenoid unit 88 operable in a well-known manner when energized to open a valve to permit flow through the line 87 and operable when de-energized to close the valve and deny flow through the conduit. The solenoid 88 is disposed in an electrical system comprising a battery 89 from which extends a positive lead 91 and a negative lead 92 establishing a circuit through the solenoid 88. A switch 93 is disposed in the line 92 and is movable to open and close the circuit in the electrical system whereby to energize and de-energize the solenoid 88.

Figure 6:
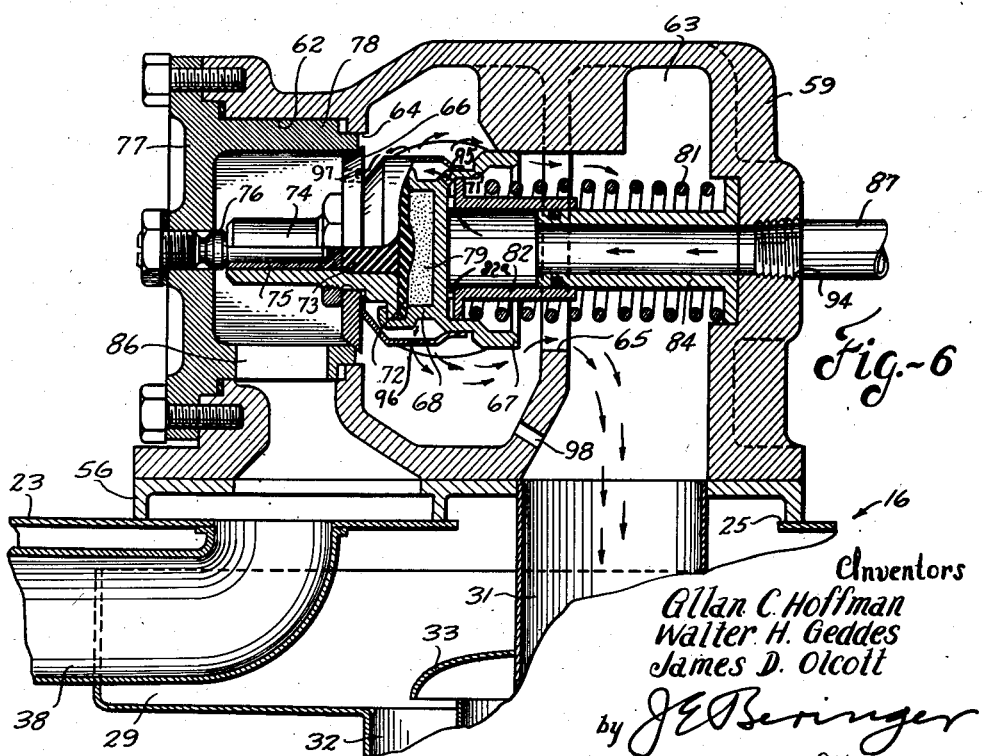
Fig. 6 is a view similar to Fig. 5, showing the sequence valve as it appears during the dilution process.

Referring to Fig. 6, the conduit 87 is received in a threaded opening 94 in the closed end of valve housing 59. The opening 94 registers with the bushing 84 of the sequence valve assembly, so that diluent entering the housing by way of conduit 87 is conducted through the bushing 84 and through the sleeve 82 to the rear of body 68. From the interior of sleeve 82 the diluent may flow past the projecting lugs 82a beneath the annular flange 83 and through a series of ports 95 in the body skirt 71 to the space between body 68 and the shroud or hood 85. Escape from the hood 85 is provided by ports 96 therein through which the diluent may flow to chamber 61 and thence by way of port 65 to conduit 31 and the hopper 27. The diluent being considerably lower in temperature than the engine oil, and further having a cooling effect by reason of its high rate of evaporation, the effect gained is a chilling of the thermal substance 79 to allow the valve assembly to move by the action of spring 81 to a position opening port 65. Accordingly, during dilution the oil flow through the tank is by way of hopper 27. As the oil flows, the diluent intermingles therewith and produces a diluted mixture of lesser density than oil alone and one which is less susceptible to congelation. The quantity of liquid flowing through the hopper 27 is increased by addition of the diluent but overflow into the main tank is prevented by the flared extension 29 of the hopper.

As is illustrated in Fig. 6, motion of the valve assembly in response to the cooling effect of diluent introduced into the system, in addition to opening port 65, causes valve 66 to close port 64. Therefore, circulation of the oil through the system is accomplished independently of the main body of oil in the tank. In order to prevent complete congelation in the manifold and lines leading to the main tank under these circumstances there is provided in the valve 66 a small diameter port 97. Through the port 97 a small amount of diluent and diluted oil may pass to the tank inlet 24 and fill the conduit 38 and manifold 39.

Further, and in connection with the operation of feathering the propeller, there is provided in the housing body 59 a small diameter port 98 connecting the inlet chamber 61 and the chamber 63 communicating with hopper 27. By reason of port 98 a continuous flow of oil to the reservoir 32 is permitted. In this manner should the propeller be feathered while the sequence valve assembly is in position denying flow to the reservoir 32 by way of port 65, the reservoir may be refilled by flow through port 98, and the feathering system so conditioned for a second operation.

Additionally, since the function of the tank is to compel dilution of the system by way of the hopper 27, during the dilution process the feathering line 34 may be filled with diluted oil by exercising the feathering pump 37. The arrangement of the reservoir 32 in the dilution path makes possible a further feature of advantage. Should the oil supply of an engine be exhausted, or inadequate to accomplish feathering, the pilot may close the dilution control switch 93 to open solenoid valve 88 and turn on the fuel boost pump, thereby filling the reservoir 32 with diluent. It will be understood that all the feathering apparatus here disclosed, including reservoir 32, is used primarily with engines of a multi-engine aircraft. In an installation for a single engine aircraft, the reservoir 32 may be omitted from the tank whereupon conduit 31 will discharge directly into hopper 27 without change in the operation of the system.

It may in some instances be desirable to accompany the act of propeller feathering with dilution of the lubricant system. Since dilution entails a diversion of oil flow from the main tank to the hopper, the feathering reservoir 32 and supply line 34 will be positively and quickly re-filled with diluted oil. To effect a concomitant action of propeller feathering and dilution the separate switches controlling the feathering pump 37 and the dilution solenoid 88 may be closed at or about the same time. Alternatively, and perhaps preferably, the switch controlling feathering pump 37 may be arranged to close and open a circuit through dilution solenoid 88 as a part of the same operations starting and stopping the feathering pump.

According to the operation of the system, in an aircraft which has been in flight for a considerable length of time the oil in the engine lubrication system is heated to the maximum value set by the oil temperature regulator, and is substantially free of diluent. The position of the sequence valve controlling flow to the oil tank is, under these conditions, substantially that shown in Fig. 5. As there illustrated, the port 65 is fully closed and the port 64 is fully opened. Therefore, substantially all the oil returned from the engine is directed to tank inlet 24 and from there passes to manifold 39 and along the assembly of baffles 42 and 44 where it is deaerated and to some extent cooled. The head pressure of the oil in the main tank is at this time sufficient to overcome the resistance of the weighted flapper valves 48 so that the oil may pass from the tank through ports 47 into the lower part of hopper 27 and out outlet 26 to conduit 15 by which it is returned to the engine. As the aircraft comes in to land, or immediately after landing, and assuming that the ambient temperature is such as to make dilution desirable, the dilution control switch 93 is closed to energize solenoid 88 and permit diluent flow through conduit 87. The diluent enters the housing 59 by way of bushing 84, as previously described, and, in flowing through the ports and passages leading to chamber 61, intimately contacts and cools the valve body 68, the body being more responsive to the diluent temperature than to the oil temperature since it is shielded from direct contact with the oil by the hood 85. In response to the cooling effect so obtained the valve assembly moves to close off port 64 and open port 65. The oil flow accordingly is diverted from tank inlet 24 to tank inlet 25 and passes to the hopper 27, having mixed therewith diluent which is supplied continuously to the system as long as switch 93 remains closed. The engine is continued in operation, circulating oil through the engine and through the hopper 27 of the tank until the desired dilution percentage has been attained, this being determined empirically or by appropriate measuring devices. As the oil circulates during dilution its density gradually becomes less so that the oil flowing through the hopper 27 has a lower density than the substantially undiluted oil in the tank outside the hopper. However, no flow of undiluted oil from the main tank into the system is permitted since the weighted flapper valves 48 hold the ports 47 closed against all but a determined difference in head pressure between the main tank and the hopper. When the desired dilution percentage is reached the dilution control switch 93 is opened to interrupt the flow of diluent to the lubrication system, and the engine is stopped. There is now present within the engine and within all the lines of the lubrication system, including the propeller feathering supply line 34 and excepting the main tank, highly diluted oil which effectively resists congelation during the period in which the aircraft stands idle.

When the engine is next started, preparatory to flight, the lubricating oil in the engine and in the system including hopper 27 of the tank, although not congealed is cold. Further, in the case of the sequence valve assembly the thermal substance 79 has responded to low temperature by moving the valve 66 to closed position and the valve 67 to opened position. Therefore, when the engine is started the oil flowing to the tank finds port 64 closed and is compelled to pass through port 65 and follow the short path through the tank defined by hopper 27. Continued operation of the engine warms the oil, and one effect of such gradually increasing temperature is to heat the hopper 27 and effect by a process of heat conduction warming of the adjacent oil in the main tank. The hopper 27 may in this sense be described as a warm-up compartment. Another result of higher oil temperature is to effect through expansion of the thermal substance 79 in valve body 68 motion of the body to open port 64. When this occurs, some of the warm oil from the engine flows to the manifold 39 in the main tank and begins a washing out or expelling of the cold oil therein. It will be understood that the manifold 39 and its supply conduit 38 have been kept clear of congealed oil by the admission of diluent through port 97 in valve 66. In order to provide for immediate flow through the main tank there is provided in the baffles 42, 44 and 46 respective openings 99, 101 and 102 adjacent the hopper 27. These openings provide a short circuit through the warmest part of the tank which is that area adjacent hopper 27 and establish a quick flow conducive to a rapid conditioning of all the oil in the tank for free flow. As the oil temperature rises still higher, and approaches the limit set by the oil cooler 21, valve 67 closes port 65 whereupon all the oil is required to pass through the main tank.

The purpose of diluting the engine lubricating oil is to provide a sufficiently low viscosity of the oil within the engine and in the communicating system so that the engine may be easily started after a period of idleness in an ambient temperature which, in undiluted oil, would produce a viscosity highly resistant to motion in the engine. In order to attain the desired low viscosity it is often necessary to add thirty to forty percent diluent by volume to the warm-up or hopper system. Such a large proportion of highly volatile and low viscosity liquid may have a harmful effect in the system if the subsequent engine warm-up is sufficiently rapid to heat the oil to a still lower viscosity before a substantial amount of the diluent has evaporated from the system. One disadvantage is that when the engine is operated at very high speed during warm-up, the lowered viscosity of the oil may provide inadequate lubrication for the engine. Another disadvantage results from a tendency for the diluted oil to acquire a high state of turbulence on discharge into the oil tank resulting in a loss of oil by effervescent boiling or spewing from the vents and breathers.

Using for purposes of illustration a typical embodiment of the present oil tank and system in an aircraft it will be described how viscosity control of the oil is achieved in a manner preventing spewing and in a manner holding the oil viscosity from falling below a predetermined safe level. Assuming that the lubricant has been diluted so that it consists of about thirty per cent diluent, and that the engine has been allowed to stand in a sub-zero temperature overnight, the diluted oil in the engine will be cold but will move in response to cranking of the engine and allow the engine to start. Rapid warm-up and continued running of the engine requires that an engine speed of 1000 to 1200 R. P. M. be maintained. Operation of the engine heats the oil, and the temperature thereof rises quickly, reaching a value of approximately 160° F. at the engine inlet in eight to twelve minutes. At first, as the oil temperature rises the oil viscosity will drop steadily until a temperature of about 90° F. is reached. This is temperature out of the engine and probably is reached five to seven minutes after the engine is started. Above a temperature of 90° some of the diluent in the oil vaporizes and leaves the lubrication system through the vents in the oil tank. As the oil temperature continues to rise the rate of vaporization of diluent increases rapidly, and, in the absence of controls for preventing such condition will bring about violent boiling in the tank hopper 27 resulting in loss of oil, and possible engine failure since the main oil supply in the tank may not be yet conditioned for flow to replace the oil lost overboard. According to the present system, however, when the temperature of the oil returning from the engine reaches approximately 130° F. the sequence valve assembly at the tank begins to open flow to tank inlet 24, permitting warm oil to pass into the main body of the tank. By this means, and as a result of the warming action obtained through the wall of hopper 27, the short circuit through baffle openings 99, 101 and 102 is opened. The oil and diluent mixture that is delivered to the tank thus displaces liquid undiluted oil around the hopper 27 which flows into the bottom of hopper 27 where it mixes with the still highly diluted oil in the hopper to supply to suction line 15 a cooler more viscous liquid than is returned to the tank from the engine. The tendency is to stabilize the viscosity of the mixture flowing into the engine at a level safely above the critical value of lubricating efficiency. Accordingly, due to the loss of diluent by vaporization and the mixture of cool undiluted oil with hot diluted oil, the oil viscosity is held from dropping below a predetermined low value until the oil out of engine temperature passes 130° F. whereupon the oil viscosity rises, since above 130° evaporation is more rapid and a larger proportion of undiluted oil is drawn from the main supply. The conditions obtaining in the lubrication system at this point are that something less than the added volume of diluent is mixed with about two-thirds the total oil supply rather than with only one-eighth or less of that supply which is represented by the volume in the warm-up hopper system, substantially all of the remaining diluent being held in the tank at a temperature which will not produce violent boiling or too rapid vaporization. This means that only a small quantity of diluent is taken into the engine and this can easily be discharged as vapor.

The tank sequence valve provides to a large degree a uniform oil temperature rise during warm-up to the operating temperature set by the oil cooler. Heretofore in oil systems with very large oil tanks temperature surges have frequently been observed caused by the fluctuation of flow from hopper to tank and back. The gradual temperature effect of the present tank sequence valve inhibits or modulates temperature surge conditions. The warm-up of the entire oil system, as indicated by the cock pit engine oil temperature gauge, may be slower than conventional systems, but complete warm-up of the tank is always assured without engine oil temperature fluctuations. It will be observed that the present system contemplates a complete thawing out and utilization of all the oil in the system. In oil tanks of the prior art, particularly those having only a single flow path, namely through the hopper, a large quantity of the main oil supply in the tank is slow to thaw, remaining as a congealed mass in the tank.

Figure 8:
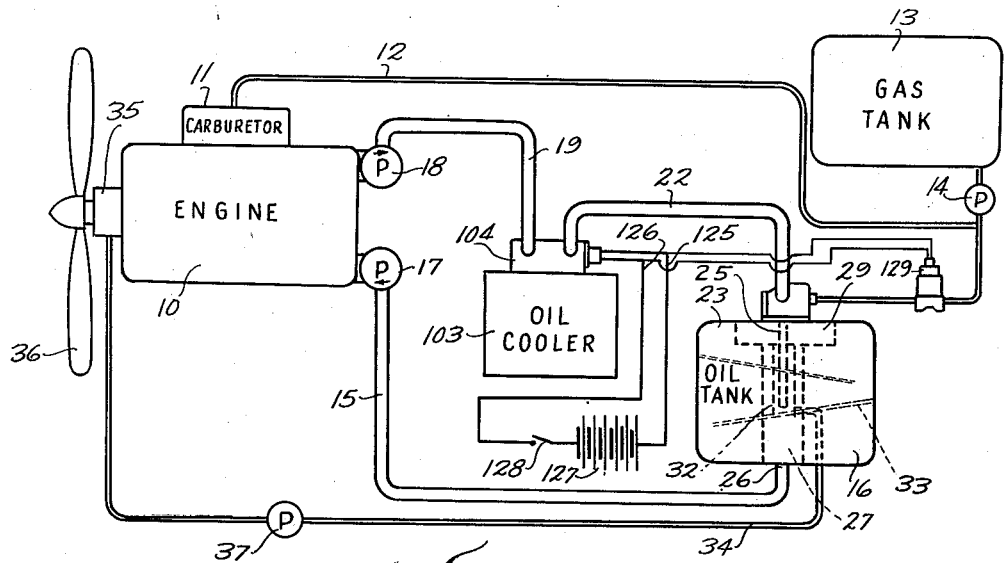
Fig. 8 is a diagram similar to Fig. 1, showing a modification of the invention affecting the oil cooler.
Figure 9:
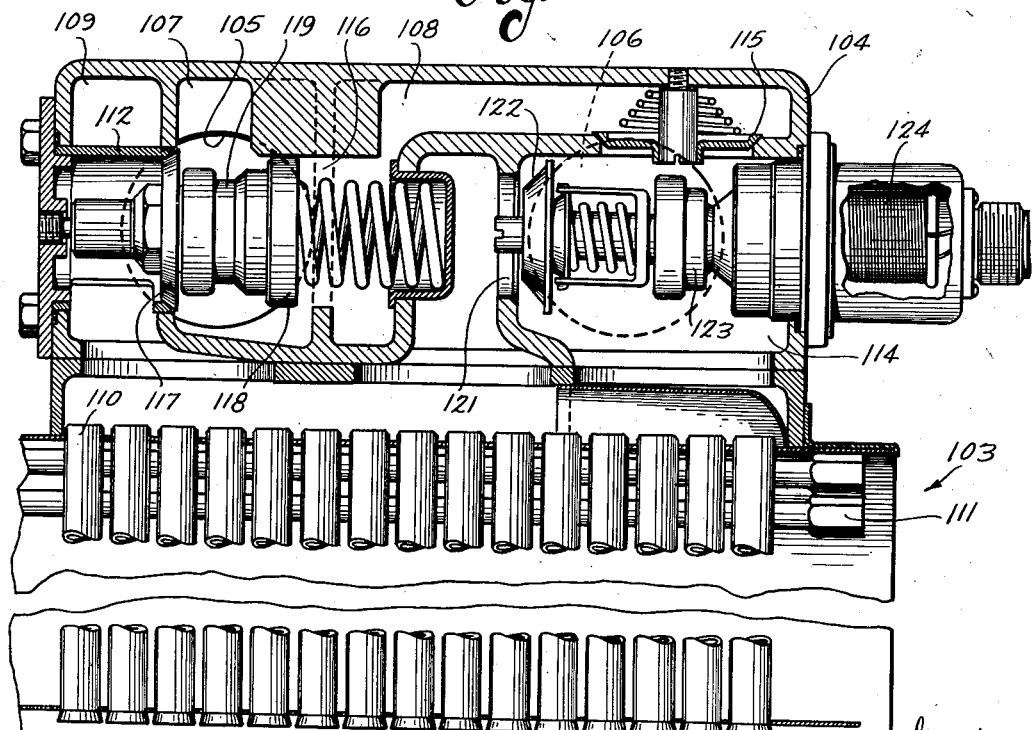
Fig. 9 is a fragmentary view in longitudinal section of the oil cooler as modified in accordance with the arrangement of Fig. 8.

According to a modification of the invention it is proposed that as a part of the same action initiating dilution in the system a valve controlling flow through the oil cooler be closed to compel flow through the cooler rather than in by-passing relationship thereto. In this manner it may be insured that during dilution the oil temperature will not rise above the level set by the cooler and as a consequence the viscosity of the oil and diluent mixture will not drop below the value of lubrication efficiency. Referring to Figs. 8 and 9, the oil cooler, here indicated at 103, has mounted thereon a valve body 104 containing inlet and outlet ports 105 and 106 connected respectively to the engine scavenge pump and to the oil tank. The valve body 104 is formed with an internal chamber 107 communicating with inlet 105 and a chamber 108 communicating with outlet 106. Another chamber 109 in the valve body communicates with the heat exchange portion of the cooler, including a series of vertical oil conduits 110 and transversely disposed core of air flow tubes 111. A port 112 connects inlet chamber 107 and chamber 109, and oil flowing through the port 112 may enter conduits 110 where it is directed to a header chamber 113 from which it may return through the core around the air flow tubes 111 to a chamber 114 in the valve body 104 and flow past a check valve 115 to chamber 108 and the outlet 106. Inlet chamber 107 is directly connected to outlet chamber 108 by a port 116, so that the oil entering body 104, may, instead of passing through port 112 to the heat exchange portion of the cooler, be by-passed directly to the outlet. A thermostatically controlled valve assembly, comprising a valve 117 controlling port 112 and a valve 118 controlling port 116, is positioned in chamber 107. A thermostat, indicated generally at 119 is disposed between the valves 117 and 118 and operates when the oil is cold to permit by-passing flow thereof through port 116 and operates when the oil is hot to close the by-pass 116 and compel flow through port 112. After passing through port 112 the oil is directed to conduits 110, and, in the event its temperature still is not such as to require cooling, may flow alternatively through a port 121 in body 104 to chamber 114 and past check valve 115 to the outlet. The port 121 is controlled by a valve 122 forming part of an assembly including a thermostat 123 arranged in chamber 114 in the path of flow to the outlet. The valve 122 normally is open but as the oil flowing thereby rises in temperature the thermostat 123 responds, moving valve 122 to close port 121 thereby requiring the oil to flow to the heat exchange portion of the cooler and be cooled.

According to the present invention the assembly comprising valve 122 and thermostat 123 is modified to include a heating coil 124 arranged adjacent the thermostat 123. As shown in Fig. 8, the heating coil 124 is arranged in an electrical circuit including positive and negative leads 125 and 126, a battery 127 and a switch 128. In series with the coil 124 in the circuit is the dilution control solenoid here indicated at 129. According to the arrangement of the parts, when the switch 128 is closed a circuit is completed through the coil 124 and through the solenoid 129 in such manner that the coil is heated to warm the thermostat 123 and the solenoid 129 is energized to admit diluent to the lubrication system. Warming of the thermostat 123 results in closing the valve 122, irrespective of the oil temperature, so that concomitantly with the addition of a diluent to the system forced cooling of the oil takes place.

What is claimed is:

1. In an engine lubrication system, an oil reservoir comprising a main tank, a hopper within said main tank, a common outlet for said main tank and said hopper, separate inlets for said main tank and said hopper, valve means responsive to the temperature of the oil for directing the oil alternatively to said inlets, said means including interconnected tank and hopper valves, and a fluid pressure responsive mounting for said valve means for motion of said hopper valve through and beyond the inlet associated with said hopper in response to excessive pressure conditions at said inlet.

2. In an engine lubrication system, the combination of an oil tank, means defining first and second oil flow paths through said tank, separate inlets to said paths, valves respectively controlling flow through said inlets, a thermostat exposed to the oil returning to the tank and operating said valves in response to variations in oil temperature, said valves acting to open said first path through the tank and to close said second path when the oil temperature is below a predetermined value and acting to close said first path and to open said second path when the oil temperature exceeds a predetermined value, means for adding a diluent to the oil in the system, said thermostat acting in response to addition of the diluent to control said valves to close said second path and to open said first path, and a passage through the valve controlling said second path permitting dilution of the oil in said second path in the closed position of said valve.

3. In an engine lubrication system, the combination of an oil tank, means defining first and second oil flow paths through said tank, the oil being directed alternatively through said paths, a common outlet from the tank for said flow paths, means for adding a diluent to the oil in the system, means for causing the oil flow to follow said first path through the tank during addition of the diluent, the oil in said second path remaining substantially undiluted and therefore more dense than the oil in said first path, and valve means for inhibiting the flow of the oil in said second path to said outlet tending to take place by reason of the difference in density of the oils in said paths.

4. In an engine lubrication system, the combination of an oil tank having first and second compartments, an outlet from the tank common to said compartments, said second compartment communicating with said outlet through said first compartment, control means for directing the oil alternatively through said compartments in accordance with the temperature thereof, means for adding a diluent to the oil in the system, the addition of the diluent affecting said control means to cause the oil to flow through said tank by way of said first compartment irrespective of the temperature thereof, and pressure responsive valve means between said first and second compartments inhibiting mixture of the more dense oil in said second compartment with the diluted oil in said first compartment.

5. In an engine lubrication system, the combination of an oil tank, means defining first and second oil flow paths through said tank, an oil control body having separated chambers constituting respectively the inlets to said first and second flow paths, the oil returning to the tank entering said body and passing therefrom to the tank alternatively through said separated chambers, a valve assembly controlling flow through said chambers, a thermostat responsive to the temperature of the oil entering said body and initiating motion of said valve assembly to open flow to said first path during a predetermined range of oil temperatures and to open flow to said second path during another and higher range of oil temperatures, means for adding a diluent to the system by way of said oil control body, and a path of entry for said diluent including a shield about said thermostat bringing flowing diluent into contact with said thermostat to the exclusion of the oil whereby said thermostat is caused to initiate motion of said valve assembly to open flow to said first path irrespective of the oil temperature.

6. In an engine lubrication system, including a supply tank having first and second flow paths therethrough, means for directing the lubricant returning from the engine through the tank alternatively by way of said first and second paths, said means including a thermostat in the path of the returning oil, means for adding a diluent to the system, said diluent flowing to the system by way of said thermostat, and a shield in the path of the returning oil ahead of the thermostat and protecting said thermostat from direct contact with the oil and enforcing an intimate contact of the diluent with the thermostat.

7. In an engine lubrication system, including a supply tank having first and second flow paths therethrough, means for directing the lubricant through the tank alternatively by way of said first and second paths, said means including a thermostat in the path of the oil and operative in response to a rising oil temperature to divert the oil flow from said first path to said second path, means for adding a diluent to the system, said diluent flowing to the system by way of said thermostat, and a shield in the path of the oil ahead of the thermostat rendering said thermostat more sensitive to the cooling effect of the diluent than to the heating effect of the oil whereby addition of the diluent is accompanied by diversion of the oil flow from said second path to said first path.

8. In an engine lubrication system, means providing alternative flow paths for the lubricant, means for controlling lubricant flow through said paths, including a thermostat, means for adding a diluent to the system, said diluent passing to the system by way of said thermostat, and a shield in the path of the oil ahead of the thermostat rendering said thermostat more sensitive to the temperature of the diluent than to the lubricant whereby lubricant flow control during the dilution process is made independent of lubricant temperature.

9. In an engine lubrication system, an oil tank, a first conduit leading from said engine to said tank and a second conduit leading from the tank to the engine, means dividing said tank into a hopper and a main section having a common outlet to said second conduit, a valve body mounted on said tank, an inlet in said body receiving the discharge end of said first conduit, valve means in said body for directing incoming oil at said inlet alternatively to said hopper or said main section of the tank or to divide the flow therebetween, all in accordance with the temperature of the oil, a source of diluent, a line leading from said source to said valve body, said diluent discharging into and mixing with the incoming oil at said inlet, selectively operable means for admitting the diluent, and continuously open small diameter passages between said inlet and said hopper and said main section of the tank for permitting a limited flow of diluted oil to both portions of the tank irrespective of the position of said valve means.

10. In an engine lubrication system, an oil tank constituting a reservoir of oil for said engine, pump and conduit means for circulating the oil between the engine and tank under pressure, means dividing said tank into a warm-up compartment and main section, a common outlet for said main section and said compartment through which the oil is discharged to the engine, a valve body on said tank defining an inlet for oil returning from the engine, first and second chambers in said body communicating respectively with said warm-up compartment and said main section of the tank, ports in said body between said inlet and said chambers, a valve assembly in said body comprising valves cooperable with said ports and a thermostat responding to temperature variation to move said valves to positions alternatively opening and closing said ports, and a mounting for said valve assembly enabling a pressure responsive motion thereof in response to fluid pressure of a predetermined high value in said inlet in a direction to open the port leading to said first chamber when said valve assembly is in a position closing said port.

11. In an engine lubrication system, an oil tank, means for circulating oil between the tank and engine, means defining relatively short and long oil flow paths through said tank, valve means mounted on said tank for directing the oil alternatively through said paths, a source of diluent, selectively operable means for admitting diluent to said tank under the control of said valve means, said diluent mixing with the oil entering said tank, a thermostat in the path of the oil entering said tank and in the path of the diluent entering said tank for operating said valve means, and a shield about said thermostat for precluding mixture of flowing diluent with said oil during flow past said thermostat.

12. In an engine lubrication system, an oil tank, means defining first and second flow paths through said tank, a valve body mounted on said tank, an oil inlet in said body, a pair of outlets respectively in communication with said first and second flow paths, first and second ports respectively connecting said inlet with said outlets, valve means in said body responding to a changed condition of the oil for directing incoming oil at said inlet alternatively through said ports, and continuously open passages of small diameter relatively to said ports for admitting a limited flow of oil to said first and second flow paths from said inlet irrespective of the position of said valve means.

13. In an engine lubrication system, an oil tank sequence valve comprising a body presenting an oil inlet and a diluent inlet and a pair of outlets, an inlet chamber into which said oil inlet opens, first and second ports respectively connecting said inlet chamber to said outlets, a valve assembly including first and second valves respectively controlling said ports and a thermostat in said inlet chamber for operating said valves, a hood surrounding said thermostat and shielding it from direct contact by the oil, discharge openings in said hood, and a passage leading from said diluent inlet to the interior of said hood.

14. An engine lubrication system according to claim 13, characterized in that said passage includes telescoping tubular elements defining a continuation of said diluent inlet to said valve assembly, one of said elements engaging said assembly and moving therewith.

15. In an engine lubrication system, the combination of an oil tank, means defining first and second oil flow paths through said tank, an oil flow control unit, including a body having a chamber receiving oil returning to the tank and first and second oppositely disposed axially aligned ports communicating said chamber respectively with said first and second paths, first and second valves in said chamber respectively controlling said first and second ports, a thermostat interconnecting said valves and responsive to the temperature of the oil in said chamber for operating said valves, said valves acting under the control of said thermotsat to direct the oil flow to said first path within a predetermined range of low temperature values, to split the oil flow between said paths within a predetermined range of intermediate temperature values, and to direct the oil flow to said second path within a predetermined range of high temperature values, and by-pass means for permitting at least a restricted oil flow to said second path in all positions of said valves.

16. In an engine lubrication system, the combination of an oil reservoir comprising a main tank and a hopper within said main tank, outlet means establishing communication between the lower parts of the tank and hopper, control means for directing the oil alternatively to the main tank and hopper in accordance with the temperature thereof, means for adding a diluent to the oil in the system, the addition of the diluent affecting said control means to cause the oil to flow through said reservoir by way of said hopper irrespective of the temperature thereof, and valve means controlling flow from said main tank through said outlet means.

17. In an engine lubrication system, the combination of an oil reservoir comprising a main tank and a hopper within said main tank, outlet means establishing communication between the lower parts of the tank and hopper, control means for directing the oil alternatively to the main tank and hopper, and valve means controlling flow from the lower part of said main tank through said outlet means.

18. In an engine lubrication system, the combination of an oil reservoir comprising a main tank and a hopper within said main tank, outlet means establishing communication between the lower parts of the tank and hopper, control means for directing the oil alternatively to the main tank and hopper in accordance with a changed condition thereof, means for adding a diluent to the oil in the system, the addition of the diluent affecting said control means to cause the oil to flow through the reservoir by way of said hopper, and valve means controlling flow from the lower part of the main tank through said outlet means to provide for segregation of the diluted and undiluted oil.

19. In an engine lubrication system, the combination of an oil cooler having a heat exchange portion and a path in by-passing relation to the heat exchange portion, an oil tank having a short circuit path therethrough, a valve associated with said oil cooler and movable to close and open said by-pass path, another valve movable to open and close said short circuit path through the tank, means including an electromagnetically operated valve for adding a diluent to the system, an electrical circuit for actuating said electromagnetic valve, means responsive to addition of the diluent for moving the said other valve to open said short circuit path, and means in series with said electromagnetic valve for initiating movement of the first said valve to close said by-pass path.

20. In an engine lubrication system, the combination of an oil cooler having a heat exchange portion and a path in by-passing relation to said heat exchange portion, a valve movable to open and close said by-pass path, a means for adding a diluent to the system comprising an electrical circuit including an electrically actuated solenoid, and means in said electrical circuit and operating in accompaniment with the energizing of said solenoid to initiate movement of said valve to close said by-pass path.

21. In an engine lubrication system, the combination of an oil cooler having a heat exchange portion and a path in by-passing relation to said heat exchange portion, means for adding a diluent to the system including an electromagnetic valve, an electrical energizing circuit for said valve, a heating coil in said circuit, a thermostat expansible under the influence of said heating coil, and a control valve movable by expansion of said thermostat to close said oil cooler by-pass path.

22. An engine lubrication system according to claim 21 having an oil tank with a short circuit path therethrough and a valve and thermostat means movable from a position closing said short circuit path to a position opening said path in response to lowering temperatures, characterized by a path of entry for said diluent bringing it into contact with the valve and thermostat means to lower the temperature of said means, said short circuit path through the tank thus being opened and the oil cooler by-pass path being closed concomitantly with addition of the diluent.

ALLAN C. HOFFMAN.
WALTER H. GEDDES.
JAMES D. OLCOTT.

REFERENCES CITED

The following references are of record in the file of this patent:

UNITED STATES PATENTS

| Number | Name | Date |
|---|---|---|
| 2,107,188 | Ryder | Feb. 1, 1938 |
| 2,245,198 | Hunter | June 10, 1941 |
| 2,311,069 | Miller | Feb. 16, 1943 |
| 2,326,051 | Miller | Aug. 3, 1943 |
| 2,338,483 | Beebe | Jan. 4, 1944 |
| 2,353,577 | Magrum | July 11, 1944 |
| 2,359,448 | Shaw | Oct. 3, 1944 |
| 2,364,119 | Anderson | Dec. 5, 1944 |
| 2,383,878 | Miller | Aug. 28, 1945 |
| 2,408,265 | Miller | Sept. 24, 1946 |
| 2,419,630 | Cruzan | Aug. 29, 1947 |
| 2,436,513 | Hostetter | Feb. 24, 1948 |
| 2,449,696 | Geddes | Sept. 21, 1948 |
| 2,483,448 | Weitzen | Oct. 4, 1949 |